United States Patent [19]
Grant

[11] 4,027,334
[45] May 31, 1977

[54] STANDBY ILLUMINATOR FOR REMOTE CONTROLLED VIEWER

[75] Inventor: Wayne T. Grant, Springfield, Va.

[73] Assignee: The United States of America as represented by the Secretary of the Army, Washington, D.C.

[22] Filed: Oct. 10, 1975

[21] Appl. No.: 621,321

[52] U.S. Cl. .............................. 358/210; 358/211; 358/113

[51] Int. Cl.² ..................... H04N 5/33; H04N 5/38; H04N 7/18

[58] Field of Search ............... 178/DIG. 29, DIG. 8, 178/DIG. 38, DIG. 11, 7.1, 7.87, 7.2, 6.8; 250/341; 358/108, 113, 109, 210, 211

[56] References Cited
UNITED STATES PATENTS

| | | | |
|---|---|---|---|
| 2,956,117 | 10/1960 | Ernst et al. | 358/108 |
| 3,748,383 | 7/1973 | Grossman | 178/7.2 |
| 3,757,039 | 9/1973 | Brewer | 178/6.8 |
| 3,891,795 | 6/1975 | Johnson et al. | 178/7.2 |

Primary Examiner—John C. Martin
Attorney, Agent, or Firm—Nathan Edelberg; John E. Holford; Robert P. Gibson

[57] ABSTRACT

A simple inexpensive circuit is provided for an active remote surveillance system which provides illumination only when required and causes a minimal drain on the remote power source.

3 Claims, 2 Drawing Figures

STANDBY ILLUMINATOR FOR REMOTE CONTROLLED VIEWER

The invention described herein may be manufactured, used, and licensed by or for the Government for governmental purposes without the payment to me of any royalty thereon.

BACKGROUND OF THE INVENTION

Remote surveillance devices have a variety of uses. They are used when the observation site is too dangerous or is inaccessible to a human observer, or when a number of sites must be watched by a lesser of observers. In many situations passive type systems are preferred, particularly when hostile personnel are being studied. As the available ambient light diminishes due to the rotation of the earth or weather conditions, these systems become less effective and sometimes useless. Since the infrared (IR) region provides the most reliable light source under low light level conditions, most sensing systems use detectors which are sensitive to that region of the spectrum. This affords the user an opportunity to use artificial illumination which cannot be seen by the naked eye. However, to use such illumination continuously would be wasteful and sometimes dangerous. By limiting its use only those times when it is actually needed, the drain on the remote systems is minimized and such systems can, in some cases, employ inexpensive photocells to charge the batteries when ambient radiation is high.

BRIEF DESCRIPTION OF INVENTION

An object of the present invention is therefore to provide electronic circuit means to switch on illuminators at a remote surveillance site, only when required by the sensing system and the ambient light conditions.

A further object is to provide a system of the type described above which is minimally affected by extraneous light sources and protects heat sensitive illuminators.

BRIEF DESCRIPTION OF THE DRAWINGS

These and other objects of the invention will be best understood with reference to the accompanying drawings wherein.

DESCRIPTION OF THE INVENTION

Figure 1:
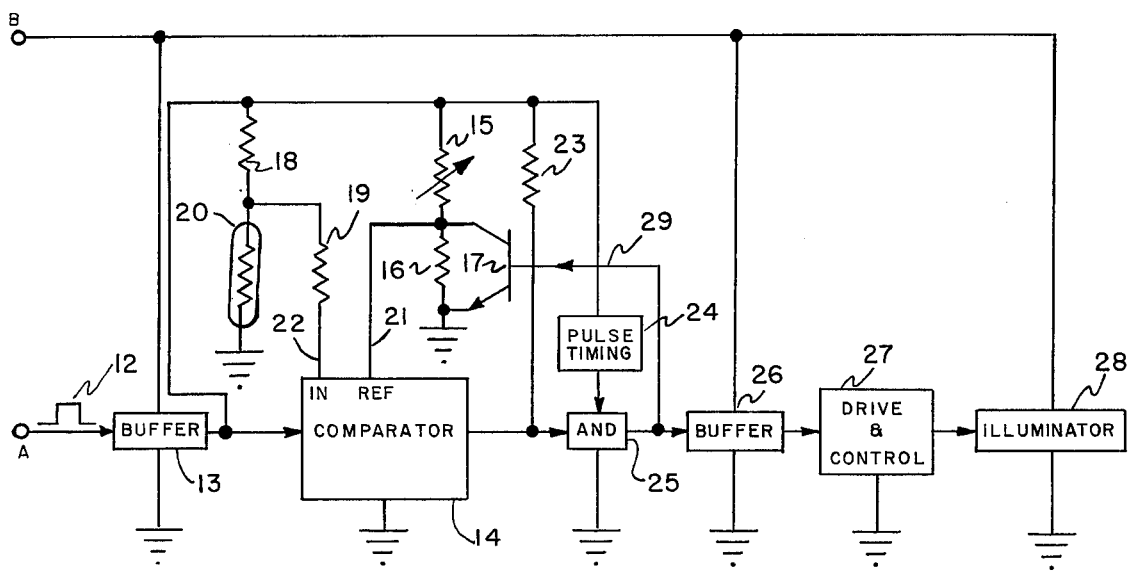
FIG. 1 shows substantially in block diagrams the circuit elements required and their relationship to one another.

As shown in the FIG. 1 the invention is adapted for use with one or more illuminators 28 which may, for example, be arrays of LED diodes, such as a type made by the Texas Instruments Company, model TIL31, each of which provides approximately 0.1 watts of illumination. Such illuminators are compatible with essentially all sensors operating in the visible and near infrared regions, e.g., BACTEC-301 photoconductors. It is also intended for use with a TV-like IR camera.

To make the most efficient use of camera elements, and incidentally to provide a measure of security when operating in an active mode, the camera system is activated only for short periods. These periods, represented by pulse 12, each last for one or more complete camera frames (standard TV format). The pulse 12 then can conveniently be sampled at a strong signal point in the camera system. Such pulses are applied to control applicant's high input impedance illumination control circuit at input terminal A. Constant voltages to charge gate terminals and to maintain negligible idler currents are supplied directly to circuits 13, 25 and 28 from the camera or any other convenient power supply B.

The input pulse 12 applied to input terminal A is a necessary condition for operation of the illuminator 28. After passing through a buffer amplifier 13 the amplified pulse 12 drives each of three input terminals of a comparator circuit 14. When present, pulse 12 establishes all of the voltages and currents for the comparator circuit. In particular, it energizes a pair of voltage dividers which furnish comparison input signals. Resistor 18 and photoconductor (or photoresistor) 20 form one divider. The photo element normally varies from a value less than resistor 18 to at least the same order of magnitude and preferably many orders of magnitude larger. A larger resistor 19 isolates the photoelement from the comparison input impedance 18 of the comparator. Resistors 15 and 16 provide a similar signal for the remaining reference input, these resistors being large enough to omit the isolation resistor. Resistor 15 is manually variable to set the reference level. Resistor 16 is bridged by an npn transistor which shunts out resistor 16, disabling the reference level once the illuminator turns on. Resistor 15 is adjusted to make the two reference voltages of the comparator equal when the ambient light on the photoelement is at a minimum value for proper camera function and the transistor is off. This permits an inversion of the comparator output whenever the ambient light passes through the minimum value. Resistor 23 provides the usual voltage pull-down to adjust the output voltage of the comparator.

The AND circuit 25 is operated only by comparator output pulses having a polarity representing the dark impedance of the photoelement 20. The other coincident input necessary to energize the AND gate is supplied by a timing pulse circuit 24 which initiates a pulse simultaneously with the comparator pulse but having an independent time width related to illuminator performance characteristics. For example, a laser diode can be operated at very high current inputs on short duty cycles, but a slight lengthening on one cycle can crack the diode. For this type of illuminator the safest timing pulse might be shorter than a camera input pulse, particularly if the latter covers a large number of frames. The required coincidence between the timing pulses and the camera pulses to energize the AND circuit thus insures safe and economical operation of the illuminator. The AND circuit output is connected through a second buffer 26 to a drive and control circuit 27. Since the preferred illuminator in the present case is an array of laser diodes with transistor switching, the illuminator is grounded and the drive and control circuit furnishes only a control signal. Only the buffer circuits require standby idler current from battery terminal B. This puts very little drain on the battery.

To stabilize the circuit under ambient light conditions near threshold there is a feedback path 29 from the output of AND gate 25 to the base of transistor 17. This further increases the difference between the reference input 21 and comparison input 22 so that voltage variations from the photoelement are rendered ineffective, once the illuminator is in operation. Thus the effects of moving shadows from clouds, swaying trees and the like are minimized.

Figure 2:
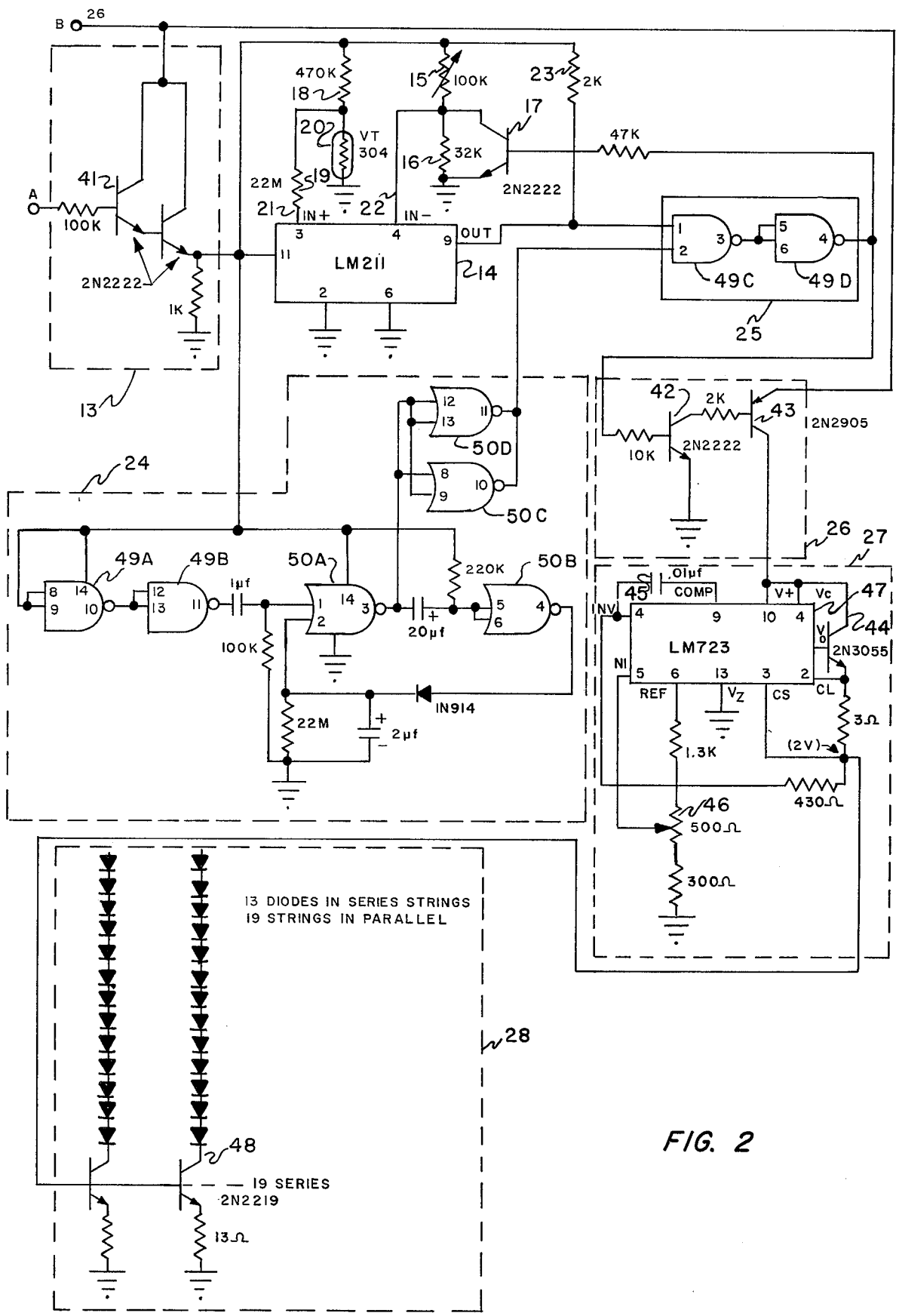
FIG. 2 shows one possible embodiment in detail.

FIG. 2 shows one possible embodiment which makes extensive use of integrated circuits. The input buffer 13 consists essentially of two low power NPN transistors 41 arranged and biased in a Darlington configuration. The comparator 14 is a flat pack type LM211 integrated circuit. Buffer 26 consists of cascaded NPN and PNP transistors 42 and 43 to obtain a high input resistance. The control and drive circuit includes an LM723 flat pack integrated circuit voltage regulator 47 driving a high power NPN transistor 44. The usual feedback compensating capacitor 45 is supplied at the inverting input to suppress switching transients in the emitter feedback current control signal. A reference voltage for the non-inverting input is derived from the internal reference using a grounded potentiometer 46 in the conventional manner. The resulting output signal is applied to the bases of the 19 NPN transistors 48 that each control a string of 13 series connected LED diodes The pulse timing circuit 24 consists of two flat pack intergrated transistors logic circuits. One contains four NAND circuits and may be a type CD4011, for example. The other, which may be a type CD4001, contains four NOR gates. Two NAND gates 49A and 49B with commoned inputs are serially connected to provide a non-inverting input buffer. Two NOR gates 50A and 50B are intercoupled to form an ac coupled one-shot multivibrator with an output pulse width determined by the RC constant of the feedback circuit. The width of the pulse depends on the type of illuminator which for the LED illuminator model described above is one to two seconds. The output is taken from 50A and buffered by the two remaining NOR gates 50C and 50D to provide the final output for the pulse timing circuit 24. The two remaining NAND gates 49C and 49D are connected to provide a non-inverting AND gate which requires the output of both the comparator 14 and the pulse timing circuit 24.

The output pulse from AND gate 25 is fed back to the base of transistor 17 to overide the action of light sensor 20 while the illuminator is on. The parallel impedance of elements 16 and 17 can be made nearly zero or as much less than that of resistor 15 as required to place the reference voltage at the opposite end of the voltage range from the dark voltage input of the sensor. Thus, even when the ambient light conditions are not stable, there will be no unnecessary strobing of the illuminator within the frame time.

Many modifications of the above circuitry will be immediately apparent to those skilled in the art, but the invention is limited only as defined in the claims which follow.

I claim:

1. In a remote viewing system wherein a television camera translates an image of a distant scene into a video electronic signal in response to a camera pulse having a width equal to at least one camera frame:

an illuminator having a spectrum which overlaps at least a portion of the light spectrum to which said camera responds; and a stand-by circuit means intercoupling said camera and illuminator, which requires less power in the absence of said camera pulse than in the presence of said camera pulse, to energize said illuminator only when the ambient light level is too low for translation by said camera and only when said camera pulse is present.

2. A remote viewing system according to claim 1 wherein:

said stand-by circuit means includes a feedback circuit means to maintain the energization of said illuminator after it has begun despite increases in the ambient light level for the duration of the coincident camera pulse.

3. A remote viewing system according to claim 1 wherein:

said stand-by circuit means includes a timing circuit to shut-off said illuminator after a predetermined period measured from the initiation of each camera pulse, said predetermined period being the longest period over which the illuminator can operate without damage due to internal heating.

* * * * *